US011316200B2

(12) United States Patent
Schmidt et al.

(10) Patent No.: US 11,316,200 B2
(45) Date of Patent: *Apr. 26, 2022

(54) METHOD FOR DRYING AND PURIFYING LITHIUM BIS(FLUOROSULFONYL)IMIDE SALT

(71) Applicant: Arkema France, Colombes (FR)

(72) Inventors: Grégory Schmidt, Saint Andeol le Chateau (FR); Rémy Teissier, Francheville (FR)

(73) Assignee: ARKEMA FRANCE, Colombes (FR)

( * ) Notice: Subject to any disclaimer, the term of this patent is extended or adjusted under 35 U.S.C. 154(b) by 129 days.

This patent is subject to a terminal disclaimer.

(21) Appl. No.: 16/331,850

(22) PCT Filed: Dec. 7, 2017

(86) PCT No.: PCT/FR2017/053446
§ 371 (c)(1),
(2) Date: Mar. 8, 2019

(87) PCT Pub. No.: WO2018/104674
PCT Pub. Date: Jun. 14, 2018

(65) Prior Publication Data
US 2019/0379088 A1 Dec. 12, 2019

(30) Foreign Application Priority Data
Dec. 8, 2016 (FR) ...................................... 1662129

(51) Int. Cl.
| | | |
|---|---|---|
| H01M 10/0568 | (2010.01) | |
| C01B 21/086 | (2006.01) | |
| H01M 10/0525 | (2010.01) | |
| B01D 3/36 | (2006.01) | |
| B01D 9/00 | (2006.01) | |
| B01D 11/04 | (2006.01) | |

(52) U.S. Cl.
CPC .......... *H01M 10/0568* (2013.01); *B01D 3/36* (2013.01); *B01D 9/0009* (2013.01); *B01D 11/0492* (2013.01); *C01B 21/086* (2013.01); *H01M 10/0525* (2013.01); *C01P 2006/40* (2013.01); *H01M 2300/0025* (2013.01)

(58) Field of Classification Search
CPC .......... H01M 10/05–0569; C01B 21/086–091; B01D 3/36; B01D 9/00–0009; B01D 11/04; B01D 11/0492
See application file for complete search history.

(56) References Cited

U.S. PATENT DOCUMENTS

| | | | |
|---|---|---|---|
| 9,079,780 B2 | 7/2015 | Sato et al. | |
| 9,586,833 B2 | 3/2017 | Sato et al. | |
| 11,084,723 B2 * | 8/2021 | Schmidt ............ | H01M 10/0568 |
| 2012/0014859 A1 | 1/2012 | Honda et al. | |
| 2012/0041233 A1 | 2/2012 | Sato et al. | |
| 2012/0258357 A1 * | 10/2012 | Kim .................. | H01M 10/0568 |
| | | | 429/199 |
| 2013/0068991 A1 | 3/2013 | Sato et al. | |
| 2013/0323155 A1 | 12/2013 | Tsubokura et al. | |
| 2014/0075746 A1 | 3/2014 | Schmidt | |
| 2015/0086466 A1 | 3/2015 | Sato et al. | |
| 2016/0016797 A1 | 1/2016 | Maekawa et al. | |
| 2017/0047607 A1 | 2/2017 | Schmidt et al. | |
| 2019/0379088 A1 | 12/2019 | Schmidt et al. | |

FOREIGN PATENT DOCUMENTS

| | | |
|---|---|---|
| EP | 2505551 A1 | 10/2012 |
| EP | 2578533 A1 | 4/2013 |
| EP | 2662332 A1 | 11/2013 |
| EP | 2977349 A1 | 1/2016 |
| JP | 2010254543 A | 11/2010 |
| JP | 2013091524 A | 5/2013 |
| JP | 2014516907 A | 7/2014 |
| JP | 2014201453 A | 10/2014 |
| JP | 2015051805 A | 3/2015 |
| JP | 2016088809 A | 5/2016 |
| JP | 2018 052760 A | 4/2018 |
| WO | 2011065502 A1 | 6/2011 |
| WO | 2011149095 A1 | 12/2011 |
| WO | 2012118063 A1 | 9/2012 |
| WO | 2014148258 A1 | 9/2014 |
| WO | 2015158979 A1 | 10/2015 |

OTHER PUBLICATIONS

Office Action (Notice of Reasons for Rejection) dated Jun. 23, 2020, by the Japanese Patent Office in corresponding Japanese Patent Application No. 2019-515221, and an English Translation of the Office Action. (10 pages).
International Search Report (PCT/ISA/210) dated Feb. 13, 2018, by the European Patent Office as the International Searching Authority for International Application No. PCT/FR2017/053446.
PCT Third Party Observation for International Application No. PCT/FR2017/053446 dated Oct. 10, 2018 (3 pages).
Written Opinion (PCT/ISA/237) dated Feb. 13, 2018, by the European Patent Office as the International Searching Authority for International Application No. PCT/FR2017/053446.
Office Action (Notice of Reasons for Rejection) dated Jul. 27, 2020 by the Japanese Patent Office in Corresponding Japanese Patent Application No. 2019-515208, and an English Translation of the Office Action. (10 pages).
International Search Report (PCT/ISA/210) and Written Opinion (PCT/ISA/237) dated Jan. 29, 2018, by the European Patent Office as the International Searching Authority for International Application No. PCT/FR2017/053447.
Third Party Observation dated Nov. 5, 2018, by the European Patent Office as the International Searching Authority for International Application No. PCT/FR2017/053447.
U.S. Appl. No. 16/331,242, Grégory Schmidt, filed March 7, 2019

* cited by examiner

Primary Examiner — Jonathan Crepeau
Assistant Examiner — Jacob Buchanan
(74) Attorney, Agent, or Firm — Buchanan Ingersoll & Rooney P.C.

(57) ABSTRACT

A method for drying and purifying a lithium bis(fluorosulfonyl)imide salt. Also, a method for producing a lithium bis(fluorosulfonyl)imide salt which is then dried and purified by the method. Further, a composition containing lithium bis(fluorosulfonyl)imide salt having a water content by mass of between 5 and 45 ppm. And, the use of the composition C in Li-ion batteries.

5 Claims, No Drawings

METHOD FOR DRYING AND PURIFYING LITHIUM BIS(FLUOROSULFONYL)IMIDE SALT

FIELD OF THE INVENTION

The present invention relates to the field of Li-ion batteries. More particularly, the invention relates to a process for drying and purifying a lithium bis(fluorosulfonyl)imide salt.

The invention also relates to a process for manufacturing a lithium bis(fluorosulfonyl)imide salt, which has been dried and purified by means of the drying and purification process according to the invention.

The present invention also relates to a lithium bis(fluorosulfonyl)imide salt comprising a reduced content of water, and various uses thereof.

The development of higher-power batteries is required for the Li-ion battery market. This is done by increasing the nominal voltage of Li-ion batteries. To achieve the targeted voltages, high-purity electrolytes are required. By virtue of their very low basicity, anions of sulfonylimide type are increasingly used in the field of energy storage in the form of inorganic salts in batteries, or of organic salts in supercapacitors or in the field of ionic liquids.

In the specific field of Li-ion batteries, the salt that is currently the most widely used is $LiPF_6$. This salt has many drawbacks, such as limited thermal stability, sensitivity to hydrolysis and thus poorer safety of the battery. Recently, novel salts bearing the fluorosulfonyl group $FSO_2^-$ have been studied and have demonstrated many advantages such as better ion conductivity and resistance to hydrolysis. One of these salts, LiFSI, has shown highly advantageous properties which make it a good candidate for replacing $LiPF_6$.

The identification and quantification of impurities in salts and/or electrolytes and the understanding of their impacts on battery performance have become paramount. For example, on account of their interference with electrochemical reactions, impurities bearing a labile proton lead to overall reduced performance qualities and stability for Li-ion batteries. The application of Li-ion batteries makes it necessary to have high-purity products (minimum amount of impurities and in particular with a very low residual moisture content).

U.S. Pat. No. 9,079,780 describes various methods for concentrating LiFSI, to overcome the formation of byproducts:
  drying under a stream of dry inert gas; and/or
  concentration of an LiFSI solution via a thin-film evaporator.

The examples of said document describe the production of LiFSI with high contents of water, for example between 58 and 323 ppm, and varied contents of other impurities. Such salts in particular have drawbacks such as problems of corrosion, safety, etc.

There is a need for a novel process for drying a lithium bis(fluorosulfonyl)imide salt which makes it possible especially to obtain said salt with a reduced content of residual water.

There is also a need to provide novel LiFSI compositions which do not have at least one of the drawbacks of the known LiFSI salts, and which are especially compatible with applications in electronics, such as Li-ion batteries.

DESCRIPTION OF THE INVENTION

The present invention relates to a process for drying and purifying a lithium bis(fluorosulfonyl)imide salt in solution in an organic solvent S1, said process comprising the following steps:

a) addition of deionized water to dissolve and extract the lithium bis(fluorosulfonyl)imide salt, forming an aqueous solution of said salt;
a') optional concentration of said aqueous solution;
b) extraction of the lithium bis(fluorosulfonyl)imide salt from said aqueous solution, with an organic solvent S2 forming an azeotropic mixture with water, this step being repeated at least once;
c) concentration of said lithium bis(fluorosulfonyl)imide salt by evaporation of said organic solvent S2 and of the water, and
d) optional crystallization of the lithium bis(fluorosulfonyl)imide salt.

In the context of the invention, the terms "lithium salt of bis(fluorosulfonyl)imide", "lithium bis(sulfonyl)imide", "LiFSI", "$LiN(FSO_2)_2$", "lithium bis(sulfonyl)imide" and "lithium bis(fluorosulfonyl)imide" are used equivalently.

In the context of the invention, the term "ppm" is understood as ppm on a weight basis.

In the context of the invention, the term "salt with a water content of less than or equal to 40 ppm by weight" means, for example, a salt with a water content of less than or equal to 40 ppm by weight relative to the total weight of said salt.

The initial solution of lithium bis(fluorosulfonyl)imide salt may come from any synthesis of the lithium bis(fluorosulfonyl)imide salt, in particular comprising the following steps:
  i) synthesis of bis(chlorosulfonyl)imide;
  ii) fluorination of bis(chlorosulfonyl)imide to bis(fluorosulfonyl)imide;
  iii) preparation of an alkali metal or alkaline-earth metal salt of bis(fluorosulfonyl)imide by neutralization of the bis(fluorosulfonyl)imide;
  iv) cation exchange to obtain the lithium bis(fluorosulfonyl)imide salt.

On conclusion of these steps, the lithium bis(fluorosulfonyl)imide salt is preferably obtained in solution in an organic solvent (corresponding in particular to the solvent S1), at a mass concentration of between 5% and 50% by mass relative to the total mass of the solution.

Such a process is described, for example, in WO 2015/158979.

According to one embodiment, the abovementioned organic solvent S1 is chosen from the group constituted of esters, nitriles, ethers, chlorinated solvents and aromatic solvents, and mixtures thereof. Preferably, the solvent S1 is chosen from dichloromethane, ethyl acetate, butyl acetate, tetrahydrofuran, acetonitrile and diethyl ether, and mixtures thereof. Preferably, the organic solvent S1 is butyl acetate.

According to the invention, the organic solvent S1 and the organic solvent S2 may be identical or different.

Preferably, the organic solvent S1 and the organic solvent S2 are identical.

According to one embodiment, the mass content of LiFSI in the organic solvent S1 is between 5% and 55%, preferably between 5% and 50%, preferentially between 10% and 55%, advantageously between 10% and 50%, for example between 10% and 40%, in particular between 15% and 40% and preferentially between 25% and 35% by mass, relative to the total mass of the solution.

According to one embodiment, step a) of the purification and drying process according to the invention comprises the addition of deionized water to the solution of LiFSI in the abovementioned organic solvent S1, for example obtained during previous synthetic steps, to allow the dissolution of said salt and the extraction of said salt into water (aqueous phase).

The extraction may be performed via any known extraction means. The extraction may typically be the separation of an aqueous phase (aqueous solution of said salt in the present case) and of an organic phase.

According to the invention, step a) of the process may be repeated at least once.

The drying and purification step of the invention may comprise one or more extractions with deionized water, for example three extractions. In a first extraction, an amount of deionized water corresponding to half of the mass of the initial solution may be added, followed by an amount equal to about a third of the mass of the initial solution during the second extraction, and then an amount equal to about a quarter of the mass of the initial solution during the third extraction.

According to a preferred embodiment, step a) is such that the mass of deionized water is greater than or equal to a third, preferably greater than or equal to half, of the mass of the initial solution of LiFSI in the organic solvent S1 (in the case of a single extraction, or for the first extraction only if step a) is repeated at least once).

The process according to the invention may comprise the addition of a volume of deionized water in step a) of greater than or equal to a third, preferably greater than or equal to half of the volume of solvent S1 of the initial solution.

In the case of multiple extractions (repetition of step a)), the extracted aqueous phases are pooled together to form a single aqueous phase.

Step a) advantageously allows the production of an aqueous phase and an organic phase, which are separate. Step b) is thus advantageously performed on the aqueous solution extracted in step a) (single aqueous phase or pooled aqueous phases in the case of repetition of step a)).

Preferably, in the process according to the invention, the organic phase(s) separated from the aqueous solution extracted in step a) (comprising the organic solvent S1 and LiFSI) are not reintroduced into the subsequent steps b) to d) of the process; in particular, they are not subsequently pooled with the organic phases extracted during step b) (comprising the organic solvent S2).

On conclusion of step a), an aqueous solution of LiFSI is obtained in particular.

According to one embodiment, the mass content of LiFSI in the aqueous solution is between 5% and 35%, preferably between 10% and 25%, relative to the total mass of the solution.

The drying and purification process according to the invention may comprise a concentration step a') between step a) and step b), preferably to obtain an aqueous solution of LiFSI comprising a mass content of LiFSI of between 20% and 80%, in particular between 25% and 75%, preferably between 25% and 70%, advantageously between 30% and 65% relative to the total mass of the solution. The concentration step may be performed with a rotary evaporator under reduced pressure, at a pressure below 50 mbar abs (preferably below 30 mbar abs), and in particular at a temperature of between 25° C. and 60° C., for example at 40° C.

Preferably, the drying and purification process according to the invention comprises step a'). After concentration a') of the aqueous solution obtained on conclusion of step a), a concentrated aqueous solution of LiFSI is obtained.

The LiFSI, contained in the aqueous solution obtained on conclusion of step a) or of an optional concentration step a') or of another optional intermediate step, may then be recovered by extraction with an organic solvent S2, said solvent S2 forming an azeotrope with water (step b)). Step b) of the process according to the invention leads in particular, after extraction, to an organic phase, saturated with water, containing the LiFSI (it is a solution of LiFSI in the organic solvent S2, said solution being saturated with water).

The extraction typically allows the separation of an aqueous phase and of an organic phase (solution of LiFSI in the solvent S2 in the present case).

Step b) advantageously allows the production of an aqueous phase and an organic phase, which are separate.

The solvent S2 for extraction of the LiFSI salt dissolved in deionized water is advantageously:
- a good solvent for the LiFSI salt, i.e. the LiFSI may have a solubility of greater than or equal to 10% by weight relative to the total weight of the sum LiFSI plus solvent; and/or
- sparingly soluble in water, i.e. it has a solubility of less than or equal to 1% by weight relative to the total weight of the sum solvent plus water.

According to one embodiment, the organic solvent S2 is chosen from the group constituted of esters, nitriles, ethers, chlorinated solvents and aromatic solvents, and mixtures thereof. Preferably, the solvent S2 is chosen from ethers and esters, and mixtures thereof. For example, mention may be made of methyl t-butyl ether, cyclopentyl methyl ether, ethyl acetate, propyl acetate, butyl acetate, dichloromethane, tetrahydrofuran, acetonitrile and diethyl ether, and mixtures thereof. Preferably, the solvent S2 is chosen from methyl t-butyl ether, cyclopentyl methyl ether, ethyl acetate, propyl acetate and butyl acetate, and mixtures thereof.

Preferably, the organic solvent S2 is butyl acetate.

The extraction step b) is repeated at least once, preferably from one to ten times and in particular four times. The organic phases may then be pooled into a single phase before step c).

Preferably, in the process according to the invention, the organic phases extracted during step b) are not pooled with the organic phase(s) obtained during step a).

For each extraction, the mass amount of organic solvent S2 used may range between 1/6 and 1 times the mass of the aqueous phase. Preferably, the organic solvent S2/water mass ratio, during an extraction of step b), ranges from 1/6 to 1/1, the number of extractions ranging in particular from 2 to 10.

Preferably, during the extraction step b), the organic solvent S2 is added to the aqueous solution obtained on conclusion of step a) (or of the optional step a')).

According to one embodiment, the mass content of LiFSI in solution in the organic phase is between 5% and 35%, preferably between 10% and 25% by mass, relative to the total mass of the solution.

The drying and purification process according to the invention may comprise a concentration step c') (preconcentration) between step b) and step c), preferably to obtain a solution of LiFSI in the organic solvent S2 comprising a mass content of LiFSI of between 20% and 60% and preferably between 30% and 50% by mass relative to the total mass of the solution.

The preconcentration step c') may be performed at a temperature ranging from 25° C. to 60° C., preferably from 25° C. to 45° C., optionally under reduced pressure, for example at a pressure below 50 mbar abs, in particular at a pressure below 30 mbar abs.

The preconcentration step c') may be performed with a rotary evaporator under reduced pressure, especially at 40° C. and at a pressure below 30 mbar abs.

According to one embodiment, step c) of the process according to the invention consists in concentrating the solution of LiFSI in the organic solvent S2 (obtained especially on conclusion of step b) or of the optional step c')).

According to one embodiment, the concentration step c) is performed under reduced pressure, preferably at a pressure of between 200 mbar abs and 0.5 mbar abs, so as advantageously to avoid high temperatures which promote the decomposition of the LiFSI, for example for a time of between 2 minutes and 48 hours, and preferably between 5 minutes and 24 hours, in particular between 10 minutes and 2 hours. The duration of step c) is especially between 45 minutes and 1 hour 15 minutes in order, for example, to concentrate 1000 g of LiFSI solution in the solvent S2. The temperature range of the concentration step may be between 30° C. and 100° C. and preferably between 40° C. and 90° C.

In particular, the drying and purification process according to the invention is such that, during step c), the organic phases formed on conclusion of step b) are pooled and concentrated by evaporation at a temperature of between 30° C. and 100° C., preferably between 40° C. and 90° C., and at a pressure of between 200 mbar abs and 0.5 mbar abs.

Any apparatus for concentrating by evaporation of the solvent may be used, in particular any apparatus making it possible to reduce the duration of the concentration step in order advantageously to reduce the risk of decomposition of the LiFSI salt. Mention may be made, for example, of a rotary evaporator, a thin-film (also known as a "scraped-film") evaporator or any other apparatus enabling concentration.

Among the thin-layer evaporators, mention may be made especially of the thin-layer evaporators sold by the companies Buss SMS Ganzler ex Luwa AG, UIC GmbH or VTA Process.

According to a preferred embodiment, the concentration step c) is performed under reduced pressure, especially at a pressure of less than 30 mbar abs, in a thin-film evaporator, at a particular temperature of 90° C., for a time of 1 hour, especially to concentrate 150 g of solution.

The drying and purification process according to the invention advantageously makes it possible to obtain an LiFSI salt in particular having a water content of less than or equal to 45 ppm by weight, preferably less than or equal to 40 ppm by weight. The process according to the invention advantageously allows the production of an LiFSI salt that is compatible with applications in electrolytes for Li-ion batteries.

According to one embodiment, the water/solvent azeotrope generally has a lower boiling point than that of the solvent S2 alone, which advantageously makes it possible to avoid or reduce the possible decomposition of the LiFSI salt. The water/solvent azeotrope formed in the process according to the invention advantageously makes it possible to remove the water.

According to the invention, on conclusion of the abovementioned step c), the LiFSI may be obtained in solid form, and in particular in crystalline form, or in the form of a concentrated solution, the concentrated solution comprising less than 10% by weight of residual solvent, preferably less than 5% by weight.

According to one embodiment, the process according to the invention also comprises a step d) of crystallization of the lithium bis(fluorosulfonyl)imide salt obtained on conclusion of the abovementioned step c).

Preferably, during step d), the LiFSI is crystallized under cold conditions, especially at a temperature of less than or equal to 25° C.

Preferably, step d) of crystallization of the LiFSI is performed in an organic solvent S3 (crystallization solvent) chosen from chlorinated solvents, for instance dichloromethane, and aromatic solvents, for instance toluene, in particular at a temperature of less than or equal to 25° C. Preferably, the LiFSI crystallized on conclusion of step d) is recovered by filtration.

According to a preferred embodiment, the process according to the invention does not comprise a filtration step, in particular with a step of filtering molecules having a size of between 0.1 and 10 μm, between step a) and the abovementioned step c).

The process according to the invention may comprise intermediate steps between the abovementioned steps of the process. Preferably, the process does not comprise intermediate steps between the abovementioned steps.

According to one embodiment, the process for drying and purifying a lithium bis(fluorosulfonyl)imide salt in solution in an organic solvent S1, according to the invention, comprises the following four steps:
a) addition of deionized water to the solution of LiFSI in an organic solvent S1, allowing extraction of the LiFSI salt into water, this step preferably being repeated at least once;
a') optional concentration of said aqueous solution;
b) extraction of said LiFSI salt using an organic solvent S2 which forms an azeotropic mixture with water;
c) concentration of the LiFSI by evaporation of said organic solvent S2 in particular entraining the water with the solvent due to the existence of the azeotrope solvent S2/water; and
d) crystallization of the bis(fluorosulfonyl)imide salt.

According to one embodiment, the drying and purification process according to the invention comprises the following steps:
a) addition of deionized water to the solution of LiFSI in the organic solvent S1, especially in butyl acetate, to dissolve and extract the lithium bis(fluorosulfonyl)imide salt, forming an aqueous solution of said salt, this step being repeated preferably at least once;
the mass content of LiFSI in the organic solvent S1 in particular being between 5% and 55%;
a') optional concentration of the solution obtained on conclusion of step a), to obtain an aqueous solution of LiFSI with an LiFSI content of between 20% and 80%, preferably between 30% and 65%;
b) extraction of the lithium bis(fluorosulfonyl)imide salt from said aqueous solution, with an organic solvent S2 which forms an azeotropic mixture with water, this step being repeated at least once;
c') optional step of concentration of the organic solution obtained on conclusion of step b), to obtain an organic solution with a mass content of LiFSI of between 20% and 60%;
c) concentration of the lithium bis(fluorosulfonyl)imide salt by evaporation of said organic solvent S2 and of the water, at a temperature between 30° C. and 100° C., preferably between 40° C. and 90° C., and at a pressure between 200 mbar abs and 0.5 mbar abs;
d) optional crystallization of the lithium bis(fluorosulfonyl)imide salt in an organic solvent S3 chosen from chlorinated solvents, for instance dichloromethane, and aromatic solvents, for instance toluene, at a temperature of less than or equal to 25° C.;
d') optional filtration to recover the LiFSI.

According to one embodiment, the drying and purification process according to the invention comprises the following steps:
- a) addition of deionized water to the solution of LiFSI in the organic solvent S1, especially in butyl acetate, to dissolve and extract the lithium bis(fluorosulfonyl) imide salt, forming an aqueous solution of said salt, this step preferably being repeated at least once;
  the mass content of LiFSI in the organic solvent S1 in particular being between 5% and 55%;
- a') concentration of the solution obtained on conclusion of step a), to obtain an aqueous solution of LiFSI with an LiFSI content of between 20% and 80%, preferably between 30% and 65%, especially at 40° C. and at a pressure of less than 30 mbar abs;
- b) extraction of the lithium bis(fluorosulfonyl)imide salt from said aqueous solution, with an organic solvent S2 which forms an azeotropic mixture with water, this step being repeated at least once;
- c) concentration of the lithium bis(fluorosulfonyl)imide salt by evaporation of said organic solvent S2 and of the water, at a temperature between 30° C. and 100° C., preferably between 40° C. and 90° C., and at a pressure between 200 mbar abs and 0.5 mbar abs;
- d) crystallization of the lithium bis(fluorosulfonyl)imide salt in an organic solvent S3 chosen from chlorinated solvents, for instance dichloromethane, and aromatic solvents, for instance toluene, at a temperature of less than or equal to 25° C.;
- d') filtration to recover the LiFSI.

The process according to the invention makes it possible to obtain LiFSI advantageously having a water content of less than or equal to 45 ppm, in particular less than or equal to 40 ppm by mass relative to the total mass of said LiFSI.

Preferably, the process according to the invention leads to an LiFSI having a mass proportion of water of, for example, between 5 and 45 ppm, between 8 and 45 ppm, between 9 and 45 ppm, between 10 and 45 ppm, between 12 and 45 ppm, between 15 and 45 ppm, between 20 and 45 ppm, between 25 and 45 ppm, between 30 and 45 ppm, between 5 and 40, between 8 and 40 ppm, between 9 and 40, between 10 and 40 ppm, between 12 and 40 ppm, between 15 and 40 ppm, between 20 and 40 ppm, between 25 and 40 ppm, or between 30 and 40 ppm by mass relative to the total mass of said salt.

Preferably, the process according to the invention leads to an LiFSI salt in which the mass proportion of sulfate ions is, for example, less than or equal to 200 ppm, less than or equal to 160 ppm, less than or equal to 150 ppm, less than or equal to 130 ppm, less than or equal to 120 ppm, less than or equal to 110 ppm, less than or equal to 100 ppm, or less than or equal to 90 ppm by mass relative to the total mass of said salt.

Preferably, the process according to the invention leads to an LiFSI salt in which the mass proportion of sulfate ions is, for example, between 5 and 200 ppm, between 5 and 160 ppm, between 5 and 150 ppm, between 5 and 140 ppm, between 5 and 130 ppm, between 5 and 120 ppm, between 5 and 110 ppm, between 5 and 100 ppm, between 5 and 80 ppm, between 8 and 200 ppm, between 8 and 160 ppm, between 8 and 150 ppm, between 8 and 140 ppm, between 8 and 130 ppm, between 8 and 120 ppm, between 8 and 110 ppm, between 8 and 100 ppm, between 8 and 80 ppm, between 10 and 160 ppm, between 10 and 150 ppm, between 10 and 140 ppm, between 10 and 130 ppm, between 10 and 120 ppm, between 10 and 110 ppm, between 10 and 100 ppm, between 10 and 80 ppm, between 15 and 160 ppm, between 15 and 150 ppm, between 15 and 140 ppm, between 15 and 130 ppm, between 15 and 120 ppm, between 15 and 110 ppm, between 15 and 100 ppm, between 15 and 80 ppm, between 20 and 200 ppm, between 20 and 160 ppm, between 20 and 150 ppm, between 20 and 140 ppm, between 20 and 130 ppm, between 20 and 120 ppm, between 20 and 110 ppm, between 20 and 100 ppm, between 20 and 80 ppm, between 25 and 160 ppm, between 25 and 150 ppm, between 25 and 140 ppm, between 25 and 130 ppm, between 25 and 120 ppm, between 25 and 110 ppm, between 25 and 100 ppm, or between 25 and 80 ppm by mass relative to the total mass of said salt.

Advantageously, the process according to the invention leads to an LiFSI salt in which the mass content of $Cl^-$ is less than or equal to 50 ppm, preferentially less than or equal to 40 ppm by mass relative to the total mass of said salt.

The process according to the invention advantageously makes it possible to obtain an LiFSI in which the mass contents of other impurities are as follows: $F^-{\leq}200$ ppm (preferably 50 ppm), $FSO_3Li{\leq}200$ ppm, $FSO_2NH_2{\leq}200$ ppm, $CO_3^{2-}{\leq}50$ ppm, $ClO_3^-{\leq}50$ ppm, $ClO_4^-{\leq}50$ ppm, $NO_2^-{\leq}50$ ppm, $NO_3^-{\leq}50$ ppm, Si≤40 ppm, Mg≤10 ppm, Fe≤10 ppm, Ca≤10 ppm, Pb≤10 ppm, Cu≤10 ppm, Cr≤10 ppm, Ni≤10 ppm, Al≤10 ppm, Zn≤10 ppm, and Na≤10 ppm.

According to one embodiment, the process according to the invention advantageously leads to an LiFSI salt comprising:
- a mass content of water of less than or equal to 45 ppm, preferably less than or equal to 40 ppm, preferably between 5 and 40 ppm, preferably between 8 and 40 ppm, in particular between 10 and 40 ppm, preferentially between 12 and 40 ppm, for example between 15 and 40 ppm, especially between 20 and 40 ppm, advantageously between 25 and 40 ppm and even more advantageously between 30 and 40 ppm;
- a mass content of sulfate ions of less than or equal to 200 ppm, in particular less than or equal to 160 ppm, for example less than or equal to 150 ppm, in particular less than or equal to 130 ppm, preferentially less than or equal to 120 ppm, more preferentially still less than or equal to 100 ppm;
- a mass content of $Cl^-$ of less than or equal to 50 ppm;
- a mass content of $F^-$ of less than or equal to 200 ppm, preferably less than or equal to 50 ppm;
- a mass content of $LiFSO_3$ of less than or equal to 200 ppm;
- a mass content of $FSO_2NH_2$ of less than or equal to 200 ppm;
- a mass content of $CO_3^{2-}$ of less than or equal to 50 ppm;
- a mass content of $ClO_3^-$ of less than or equal to 50 ppm;
- a mass content of $ClO_4^-$ of less than or equal to 50 ppm;
- a mass content of $NO_2^-$ of less than or equal to 50 ppm;
- a mass content of $NO_3^-$ of less than or equal to 50 ppm;
- a mass content of Si of less than or equal to 40 ppm;
- a mass content of Mg of less than or equal to 10 ppm;
- a mass content of Fe of less than or equal to 10 ppm;
- a mass content of Ca of less than or equal to 10 ppm;
- a mass content of Pb of less than or equal to 10 ppm;
- a mass content of Cu of less than or equal to 10 ppm;
- a mass content of $Cl^-$ of less than or equal to 10 ppm;
- a mass content of Ni of less than or equal to 10 ppm;
- a mass content of Al of less than or equal to 10 ppm;
- a mass content of Zn of less than or equal to 10 ppm; and
- a mass content of Na of less than or equal to 10 ppm.

The LiFSI salt obtained according to the process of the invention is advantageously suitable for use in Li-ion battery electrolytes.

The present invention also relates to an LiFSI salt which may be obtained according to the purification and drying process as described previously, and their use in Li-ion battery electrolytes.

The invention also relates to a process for manufacturing a lithium bis(fluorosulfonyl)imide salt, which comprises, in addition to steps i) to iv) mentioned above, steps a) to d) of the drying and purification process according to the invention.

According to a second aspect, the invention relates to a process for preparing a lithium bis(fluorosulfonyl)imide salt, which comprises, upstream of steps a) to d) of the abovementioned drying and purification process, the following steps i) to iv):

i) synthesis of bis(chlorosulfonyl)imide;
ii) fluorination of bis(chlorosulfonyl)imide to bis(fluorosulfonyl)imide;
iii) preparation of the alkali metal or alkaline-earth metal salt of bis(fluorosulfonyl)imide by neutralization of the bis(fluorosulfonyl)imide;
iv) cation exchange to obtain a lithium bis(fluorosulfonyl)imide salt.

According to one embodiment, the lithium bis(fluorosulfonyl)imide salt is prepared as described below.

According to one embodiment, the present invention relates to a process for preparing a lithium bis(fluorosulfonyl)imide salt, comprising the following steps:

i) synthesis of bis(chlorosulfonyl)imide from sulfamic acid;
ii) fluorination of bis(chlorosulfonyl)imide to bis(fluorosulfonyl)imide;
iii) preparation of the alkali metal or alkaline-earth metal salt of bis(fluorosulfonyl)imide by neutralization of the bis(fluorosulfonyl)imide, in particular using an aqueous solution of a base chosen from alkali metal or alkaline-earth metal carbonates, and alkali metal or alkaline-earth metal hydroxides;
iv) cation exchange to obtain a lithium bis(fluorosulfonyl)imide salt;
v) abovementioned drying and purification process according to the invention, comprising steps a) to d) as described above.

The process for preparing the lithium bis(fluorosulfonyl)imide salt according to the invention advantageously leads to an LiFSI salt having a mass content of water of less than or equal to 45 ppm, preferably less than or equal to 40 ppm by mass relative to the total mass of said salt.

Step i): Synthesis of bis(chlorosulfonyl)imide

Compound (A) containing two chlorosulfonyl groups (bis(chlorosulfonyl)imide) may be prepared from sulfamic acid, in particular according to the following scheme:

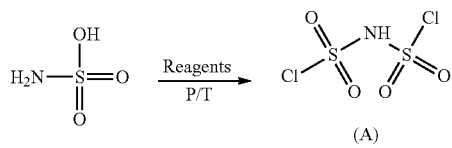

According to one embodiment, the reaction temperature is between 30° C. and 150° C.

According to one embodiment, the reaction time is between 1 hour and 7 days.

According to one embodiment, the reaction may be performed at a pressure of between 1 bar absolute and 7 bar absolute.

According to one embodiment, the reagents may be chlorosulfonic acid ($ClSO_3H$), and a chlorinating agent chosen from thionyl chloride ($SOCl_2$), oxalyl chloride ($COCl)_2$, phosphorus pentachloride ($PCl_5$), phosphonyl trichloride ($PCl_3$), phosphoryl trichloride ($POCl_3$), and mixtures thereof.

According to the invention, a catalyst chosen from a tertiary amine such as methylamine, triethylamine, diethylmethylamine; pyridine; and 2,6-lutidine, may be added to accelerate the reaction.

According to one embodiment, the mole ratio between the chlorosulfonic acid and the sulfamic acid is between 1 and 5.

According to one embodiment, the mole ratio between the chlorinating agent and the sulfamic acid is between 2 and 5.

According to one embodiment, the reagents may be sulfamic acid, and sulfuric acid or oleum, and a chlorinating agent chosen from thionyl chloride ($SOCl_2$), oxalyl chloride ($COCl)_2$, phosphorus pentachloride ($PCl_5$), phosphonyl trichloride ($PCl_3$), phosphoryl trichloride ($POCl_3$), and mixtures thereof. A catalyst chosen from a tertiary amine such as methylamine, triethylamine, diethylmethylamine, pyridine and 2,6-lutidine may be added to accelerate the reaction. According to one embodiment, the mole ratio between the sulfuric acid (or the oleum) and the sulfamic acid is between 0.7 and 5. According to one embodiment, the mole ratio between the chlorinating agent and the sulfamic acid is between 3 and 10.

Step ii): Fluorination of bis(chlorosulfonyl)imide to bis(fluorosulfonyl)imide

The process for preparing the LiFSI salt may comprise at least one step of reacting a compound of formula (A), obtained especially on conclusion of the abovementioned step i), with anhydrous hydrofluoric acid, in at least one organic solvent.

Step ii) especially allows the fluorination of compound (A) to a compound (B) as described below.

The fluorination step with anhydrous hydrofluoric acid, according to the present invention, may be represented schematically as follows:

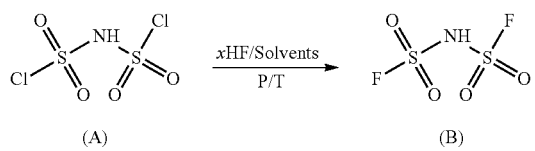

Preferably, the solvent used in the abovementioned step ii) is an organic solvent, in particular having a donor number of between 1 and 70, advantageously between 5 and 65. The donor number of a solvent represents the value $-\Delta H$, $\Delta H$ being the enthalpy of the interaction between the solvent and antimony pentachloride (Journal of Solution Chemistry, vol. 13, No. 9, 1984). Organic solvents that may especially be mentioned include esters, nitriles or dinitriles, ethers or diethers, amines and phosphines. Combinations thereof may also be used as organic solvent.

Methyl acetate, ethyl acetate, butyl acetate, acetonitrile, propionitrile, isobutyronitrile, glutaronitrile, dioxane, tetrahydrofuran, triethylamine, tripropylamine, diethylisopropylamine, pyridine, trimethylphosphine, triethylphosphine, diethylisopropylphosphine and mixtures thereof may be suitable for use as solvents.

Preferably, the solvent is an organic solvent soluble in water.

Preferably, the organic solvent is dioxane.

The reaction step with anhydrous hydrofluoric acid may be performed at a temperature T preferably between 0° C. and the boiling point of the solvent or solvent mixture used. Advantageously, this temperature is between 5° C. and the boiling point of the solvent or solvent mixture.

The reaction step with anhydrous hydrofluoric acid may be performed at a pressure P preferably between 0 and 16 bar abs.

This step is preferably performed by dissolving the compound of formula (A) in the solvent or the solvent mixture, prior to the step of reaction with anhydrous HF.

The mass ratio between the compound of formula (A) and the solvent or solvent mixture is preferably between 0.001 and 10, and advantageously between 0.005 and 5.

According to one embodiment, HF is introduced into the reaction medium preferably in gaseous form.

The mole ratio x between the HF and the compound of formula (A) used is preferably between 2 and 10, and advantageously between 2 and 5.

The step of reaction with HF may be performed in a closed medium or in an open medium; preferably, step iii) is performed in an open medium with evolution of HCl in gaseous form.

The use of a donor solvent in particular allows the formation of a solvent-HF complex, and thus to enhance the nucleophilicity of the fluorine atom. The use of such a complex advantageously allows mild fluorination of the compound of formula (A), thus avoiding spurious cleavage reactions.

Step iii): Preparation of the bis(fluorosulfonyl)imide salt by neutralization of the bis(fluorosulfonyl)imide According to one embodiment, the process for preparing the lithium bis(fluorosulfonyl)imide salt comprises, on conclusion of the fluorination step ii), a neutralization step (step iii)).

According to one embodiment, the neutralization step is performed using an aqueous solution of a base chosen from alkali metal or alkaline-earth metal carbonates of formula $MCO_3.nH_2O$ or alkali metal or alkaline-earth metal hydroxides $MOH.nH_2O$ with M representing a monovalent alkali metal or alkaline-earth metal cation. Preferably, MOH represents NaOH, KOH RbOH or CsOH. Preferably, $MCO_3$ represents $Na_2CO_3$, $K_2CO_3$, $Rb_2CO_3$ or $Cs_2CO_3$.

Preferably, M does not represent Li.

Preferably, the base used is not a base comprising lithium. Preferably, the base used comprises potassium.

The abovementioned step iii) is especially performed according to the following scheme:

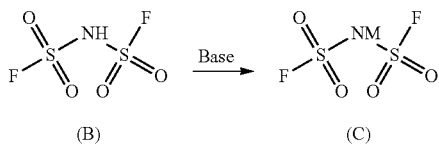

Preferably, the neutralization step leads to a solution of (C) with a pH of greater than 4.

In particular, the residual HF and/or the residual HCl dissolved in the solvent reacts with the base described above, so as to form an alkali metal or alkaline-earth metal fluoride MF (or a mixture of fluorides MF), or, respectively, an alkali metal or alkaline-earth metal chloride MCl (or a mixture of chlorides MCl). The neutralization reaction may be performed, for example, by adding an aqueous solution of the chosen base. The base/compound (B) mole ratio may be, for example, from 1 to 5 when the base is a hydroxide, or from 0.5 to 5 (or from 2 to 10) when the base is a carbonate. The reaction temperature may be, for example, between −10° C. and 40° C.

According to the invention, the aqueous solution comprising compound (C) may then be filtered.

Depending on the nature of the alkali metal or alkaline-earth metal, the product (C) may be present in the filtrate or in the filtered solid. The alkali metal or alkaline-earth metal fluorides are especially present in the filtered solid, but may also be found in the filtrate.

Two different steps for recovering the product (C) may be used on conclusion of step iii), depending on where the product (C) is predominantly found: step R1 or step R2.

According to a first recovery method (step R1), when the product (C) is predominantly contained in the aqueous phase (filtrate), the aqueous phase may be extracted with an organic solvent chosen from the following families: esters, nitriles, ethers, chlorinated solvents, aromatic solvents, and mixtures thereof. Preferably, the organic solvent is chosen from dichloromethane, ethyl acetate, butyl acetate, tetrahydrofuran, acetonitrile and diethyl ether, and mixtures thereof. In particular, it is butyl acetate.

For each extraction, the mass amount of organic solvent used may range between 1/6 and 1 times the mass of the aqueous phase. The number of extractions may be between 2 and 10. Preferably, the organic phase resulting from the extraction has a mass content of bis(fluorosulfonyl)imide salt ranging from 5% to 50% by mass. The organic phase may then be concentrated to reach a bis(fluorosulfonyl)imide salt concentration of between 5% and 55%, preferably between 10% and 50% by mass, said concentration possibly being achieved by any evaporation means known to those skilled in the art.

According to a second recovery method (step R2), when it is mainly contained in the cake (filtered solid), the product (C) may be recovered by washing the cake with an organic solvent chosen from the following families: esters, nitriles, ethers, chlorinated solvents, aromatic solvents, and mixtures thereof. Preferably, the organic solvent is chosen from dichloromethane, ethyl acetate, butyl acetate, tetrahydrofuran, acetonitrile and diethyl ether, and mixtures thereof. In particular, it is butyl acetate.

The mass amount of organic solvent used may range between 1 and 10 times the weight of the cake. The total amount of organic solvent intended for the washing may be used in a single portion or in several portions for the purpose especially of optimizing the dissolution of the product (C). Preferably, the organic phase resulting from the extraction has a mass content of LiFSI salt ranging from 5% to 50% by mass. The organic phase may then be concentrated to reach a bis(fluorosulfonyl)imide salt concentration of between 5% and 55%, preferably between 10% and 50% by mass, said concentration possibly being achieved by any evaporation means known to those skilled in the art.

Preferably, compound (C) is such that M=K.

Step iv): cation exchange to obtain a lithium bis(fluorosulfonyl)imide salt

A final cation-exchange step may be performed, for example according to the following scheme:

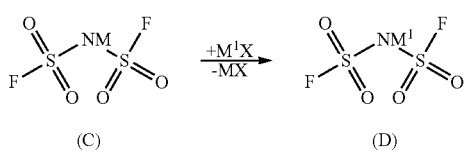

in which $M^1$=Li and X may be a fluoride, a chloride, a carbonate, a hydroxide, a sulfate, a chlorate, a perchlorate, a nitrite or a nitrate.

The salt $M^1X$ may be dissolved in a polar organic solvent chosen from the following families: alcohols, nitriles and carbonates. Examples that may especially be mentioned include methanol, ethanol, acetonitrile, dimethyl carbonate and ethyl methyl carbonate. This solution may be poured into a solution of product (C) in an organic solvent chosen from the following families: esters, nitriles, ethers, chlorinated solvents, aromatic solvents, and mixtures thereof. Preferably, the solvent is chosen from dichloromethane, ethyl acetate, butyl acetate, tetrahydrofuran, acetonitrile and diethyl ether, and mixtures thereof. Preferably, the solvent is butyl acetate.

The mole ratio of product (C) relative to $M^1X$ may vary: it may be at least equal to 1 and less than 5. Preferably, the mole ratio (C)/$M^1X$ is between 1.2 and 2.

The reaction medium may be left stirring for between 1 and 24 hours at a temperature of between, for example, 0 and 50° C. At the end of the reaction, the reaction medium may be filtered to remove the precipitated MX formed. The filtrate may then be concentrated to remove the solvent for the salt $M^1X$ with a boiling point of less than or equal to 90° C. A precipitate of MX may then form again and may be removed by filtration. By means of this purification, the relative mass content of the impurity M relative to the product (D) is advantageously less than or equal to 500 ppm.

According to a first embodiment, the solution of the product (D) obtained after the filtration(s) is evaporated, with a thin-film evaporator, with an atomizer, with a rotary evaporator, or with any other apparatus for solvent evaporation.

Compound (D) may then be subjected to the purification and drying process according to the invention described above, especially comprising the following steps:
a) addition of deionized water to form an aqueous solution of compound (D) (lithium bis(fluorosulfonyl)imide salt);
a') optional concentration of said aqueous solution;
b) extraction of the lithium bis(fluorosulfonyl)imide salt from said aqueous solution, using an organic solvent S2 forming an azeotropic mixture with water, this step being repeated at least once;
c) concentration of the lithium bis(fluorosulfonyl)imide salt by evaporation of said organic solvent S2 and of the water, and
d) optional crystallization of the lithium bis(fluorosulfonyl)imide salt.

The product (D) purified according to the process of the invention is advantageously in the form of a white powder.

The present invention also relates to a lithium bis(fluorosulfonyl)imide salt comprising a mass content of water of between 5 and 45 ppm, preferably between 5 and 40 ppm by mass relative to the total mass of said salt.

The present invention also relates to a composition C comprising:
at least 99.80%, preferably at least 99.85%, advantageously at least 99.90% and preferentially at least 99.95% by weight of lithium bis(fluorosulfonyl)imide salt (LiFSI) relative to the total weight of the composition; and
between 5 ppm and 45 ppm, preferably between 5 and 40 ppm by mass of water relative to the total mass of composition C.

In the LiFSI salt according to the invention (or in composition C according to the invention), the mass proportion of water may be, for example, between 8 and 45 ppm, between 9 and 45 ppm, between 10 and 45 ppm, between 11 and 45 ppm, between 12 and 45 ppm, between 13 and 45 ppm, between 14 and 45 ppm, between 15 and 45 ppm, between 16 and 45 ppm, between 17 and 45 ppm, between 18 and 45 ppm, between 19 and 45 ppm, between 20 and 45 ppm, between 21 and 45 ppm, between 22 and 45 ppm, between 23 and 45 ppm, between 24 and 45 ppm, between 25 and 45 ppm, between 26 and 45 ppm, between 27 and 45 ppm, between 28 and 45 ppm, between 29 and 45 ppm, between 30 and 45 ppm, between 8 and 40 ppm, between 9 and 40 ppm, between 10 and 40 ppm, between 11 and 40 ppm, between 12 and 40 ppm, between 13 and 40 ppm, between 14 and 40 ppm, between 15 and 40 ppm, between 16 and 40 ppm, between 17 and 40 ppm, between 18 and 40 ppm, between 19 and 40 ppm, between 20 and 40 ppm, between 21 and 40 ppm, between 22 and 40 ppm, between 23 and 40 ppm, between 24 and 40 ppm, between 25 and 40 ppm, between 26 and 40 ppm, between 27 and 40 ppm, between 28 and 40 ppm, between 29 and 40 ppm or between 30 and 40 ppm by mass relative to the total mass of said salt (or, respectively, relative to the total mass of composition C).

In the LiFSI salt according to the invention (or in composition C according to the invention), the mass proportion of sulfate ions may be, for example, less than or equal to 200 ppm, less than or equal to 160 ppm, less than or equal to 150 ppm, less than or equal to 130 ppm, less than or equal to 120 ppm, less than or equal to 110 ppm, less than or equal to 100 ppm, or less than or equal to 90 ppm by mass relative to the total mass of said salt (or, respectively, relative to the total mass of composition C).

In the LiFSI salt according to the invention (or in composition C according to the invention), the mass proportion of sulfate ions may be, for example, between 5 and 200 ppm, between 5 and 160 ppm, between 5 and 150 ppm, between 5 and 140 ppm, between 5 and 130 ppm, between 5 and 120 ppm, between 5 and 110 ppm, between 5 and 100 ppm, between 5 and 80 ppm, between 8 and 200 ppm, between 8 and 160 ppm, between 8 and 150 ppm, between 8 and 140 ppm, between 8 and 130 ppm, between 8 and 120 ppm, between 8 and 110 ppm, between 8 and 100 ppm, between 8 and 80 ppm, between 10 and 160 ppm, between 10 and 150 ppm, between 10 and 140 ppm, between 10 and 130 ppm, between 10 and 120 ppm, between 10 and 110 ppm, between 10 and 100 ppm, between 10 and 80 ppm, between 15 and 160 ppm, between 15 and 150 ppm, between 15 and 140 ppm, between 15 and 130 ppm, between 15 and 120 ppm, between 15 and 110 ppm, between 15 and 100 ppm, between 15 and 80 ppm, between 20 and 200 ppm, between 20 and 160 ppm, between 20 and 150 ppm, between 20 and 140 ppm, between 20 and 130 ppm, between 20 and 120 ppm, between 20 and 110 ppm, between 20 and 100 ppm, between 20 and 80 ppm, between 25 and 160 ppm, between 25 and 150 ppm, between 25 and 140 ppm, between 25 and 130 ppm, between 25 and 120 ppm, between 25 and 110 ppm, between 25 and 100 ppm, or between 25 and 80 ppm by mass relative to the total mass of said salt (or, respectively, relative to the total mass of composition C).

According to one embodiment, the LiFSI salt (or composition C according to the invention) has a content of Cl⁻ ions of less than or equal to 50 ppm by weight relative to the total weight of said salt (or, respectively, relative to the total weight of composition C).

In particular, the LiFSI salt according to the invention (or composition C according to the invention) comprises the following impurities: F⁻ 200 ppm (preferably ≤50 ppm), $FSO_3Li \le 200$ ppm, $FSO_2NH_2 \le 200$ ppm, $CO_3^{2-} \le 50$ ppm, $ClO_3^- \le 50$ ppm, $ClO_4^- \le 50$ ppm, $NO_2^- \le 50$ ppm, $NO_3^- \le 50$ ppm, Si≤40 ppm, Mg≤10 ppm, Fe≤10 ppm, Ca≤10 ppm, Pb≤10 ppm, Cu≤10 ppm, Cr≤10 ppm, Ni≤10 ppm, Al≤10 ppm, Zn≤10 ppm, and Na≤10 ppm.

According to a preferred embodiment, the LiFSI according to the invention (or composition C according to the invention) comprises:
- a mass content of water of between 5 and 45 ppm, and in particular between, for example, 8 and 45 ppm, between 9 and 45 ppm, between 10 and 45 ppm, between 11 and 45 ppm, between 12 and 45 ppm, between 13 and 45 ppm, between 14 and 45 ppm, between 15 and 45 ppm, between 16 and 45 ppm, between 17 and 45 ppm, between 18 and 45 ppm, between 19 and 45 ppm, between 20 and 45 ppm, between 21 and 45 ppm, between 22 and 45 ppm, between 23 and 45, between 24 and 45 ppm, between 25 and 45, between 26 and 45 ppm, between 27 and 45 ppm, between 28 and 45 ppm, between 29 and 45 ppm, between 30 and 45 ppm, or between 30 and 40 ppm by mass relative to the total mass of said salt (or, respectively, relative to the total mass of composition C);
- a mass content of sulfate ions of less than or equal to 200 ppm, for example between 5 and 200 ppm, between 5 and 160 ppm, between 5 and 150 ppm, between 5 and 140 ppm, between 5 and 130 ppm, between 5 and 120 ppm, between 5 and 110 ppm, between 5 and 100 ppm, between 5 and 80 ppm, between 8 and 200 ppm, between 8 and 160 ppm, between 8 and 150 ppm, between 8 and 140 ppm, between 8 and 130 ppm, between 8 and 120 ppm, between 8 and 110 ppm, between 8 and 100 ppm, between 8 and 80 ppm, between 10 and 160 ppm, between 10 and 150 ppm, between 10 and 140 ppm, between 10 and 130 ppm, between 10 and 120 ppm, between 10 and 110 ppm, between 10 and 100 ppm, between 10 and 80 ppm, between 15 and 160 ppm, between 15 and 150 ppm, between 15 and 140 ppm, between 15 and 130 ppm, between 15 and 120 ppm, between 15 and 110 ppm, between 15 and 100 ppm, between 15 and 80 ppm, between 20 and 200 ppm, between 20 and 160 ppm, between 20 and 150 ppm, between 20 and 140 ppm, between 20 and 130 ppm, between 20 and 120 ppm, between 20 and 110 ppm, between 20 and 100 ppm, between 20 and 80 ppm, between 25 and 160 ppm, between 25 and 150 ppm, between 25 and 140 ppm, between 25 and 130 ppm, between 25 and 120 ppm, between 25 and 110 ppm, between 25 and 100 ppm, or between 25 and 80 ppm by mass relative to the total mass of said salt (or, respectively, relative to the total mass of composition C); and
- a mass content of Cl⁻ of less than or equal to 50 ppm by weight;
- a mass content of F⁻ of less than or equal to 200 ppm, preferably less than or equal to 50 ppm;
- a mass content of $FSO_3Li$ of less than or equal to 200 ppm;
- a mass content of $FSO_2NH_2$ of less than or equal to 200 ppm;
- a mass content of $CO_3^{2-}$ of less than or equal to 50 ppm;
- a mass content of $ClO_3^-$ of less than or equal to 50 ppm;
- a mass content of $ClO_4^-$ of less than or equal to 50 ppm;
- a mass content of $NO_2^-$ of less than or equal to 50 ppm;
- a mass content of $NO_3^-$ of less than or equal to 50 ppm;
- a mass content of Si of less than or equal to 40 ppm;
- a mass content of Mg of less than or equal to 10 ppm;
- a mass content of Fe of less than or equal to 10 ppm;
- a mass content of Ca of less than or equal to 10 ppm;
- a mass content of Pb of less than or equal to 10 ppm;
- a mass content of Cu of less than or equal to 10 ppm;
- a mass content of Cl⁻ of less than or equal to 10 ppm;
- a mass content of Ni of less than or equal to 10 ppm;
- a mass content of Al of less than or equal to 10 ppm;
- a mass content of Zn of less than or equal to 10 ppm; and
- a mass content of Na of less than or equal to 10 ppm.

The present invention also relates to the use of the LiFSI salt according to the invention (or composition C according to the invention) in Li-ion batteries, especially in Li-ion battery electrolytes.

In particular, the LiFSI salt according to the invention (or composition C according to the invention) may be used in Li-ion batteries of mobile devices (for example cellphones, cameras, tablet or laptop computers), or electric vehicles, or for storing renewable energy (such as photovoltaic or wind energy).

The LiFSI salt (or composition C according to the invention) may be used especially in batteries of "pocket" type (also known as "pouch cells").

The LiFSI salt (or composition C according to the invention) may advantageously be used in applications at high or low temperature.

The LiFSI salt according to the invention (or composition C according to the invention) advantageously has at least one of the following advantages:
- reduction of the risks of short-circuiting, of ignition or of explosion of the battery;
- longer service life;
- increase in the number of charging cycles;
- reduction or even elimination of corrosion of the battery constituents, such as the Al collector;
- reduction of the risks of swelling of the battery, especially of flexible batteries of "pocket" type (known as "pouch cells");
- good resistance to high and/or low temperature.

In the context of the invention, the term "between x and y" or "ranging from x to y" means a range in which the limits x and y are included. For example, the temperature "between 30 and 100° C." especially includes the values 30° C. and 100° C.

All the embodiments described above may be combined with each other. In particular, each embodiment of any step of the process of the invention may be combined with another particular embodiment.

The present invention is illustrated by the example which follows, to which it is not, however, limited.

Example 1: Purification and analysis of the contents of impurities in the lithium bis(fluorosulfonyl)imide salt prepared by the process according to the invention Various impurities present in the lithium bis(fluorosulfonyl)imide salt were analyzed and the results obtained are presented below.

Purification of a Solution of LiFSI in Butyl Acetate

A solution is taken containing 166 g of LiFSI (which may be obtained, for example, according to the process described in WO 2015/158979) in 830 g of butyl acetate. It is concentrated in a rotary evaporator heated to 40° C. under vacuum (pressure <30 mbar abs). A solution is obtained whose solids content is 34% by mass. Aqueous extraction of the LiFSI contained is performed three times (addition of ½ mass of water relative to the mass of the concentrated solution (solids content of 34% by mass), and then ⅓ mass of water relative to the mass of the concentrated solution (solids content of 34% by mass) and then ¼ of mass of water relative to the mass of the concentrated solution (solids content of 34% by mass)). The aqueous phases are pooled (the solids content is 18% by mass) and concentrated by evaporation under vacuum (P<30 mbar abs) at 40° C., to obtain a solution whose solids content is 32% by mass. The LiFSI recovery yield is 73%. The LiFSI dissolved in water is then re-extracted with four successive extractions in butyl acetate by ¼ of the mass of the aqueous solution. A solution of LiFSI in butyl acetate is obtained (the solids content being about 12%). The LiFSI extraction yield is 62%.

Drying of the LiFSI

The solvent-phase extractions are pooled and concentrated first on a rotary evaporator at 40° C. under reduced pressure (P<30 mbar abs). A solution of LiFSI whose solids content is 42% is obtained. The final concentration is performed on a thin-film evaporator (of Luwa type) at 90° C. with an internal surface area of 0.04 m² and under a pressure of 5 mbar abs for a time of 1 hour 11 minutes. 72 g of LiFSI which crystallizes when cold are obtained, and are recovered by filtration, the analysis of which is given below.

Sampling for the Quantification of Li, Na and Trace Elements from the List Provided:

The sample of the lithium bis(fluorosulfonyl)imide salt obtained according to the process described above is dissolved in ultra-pure water. Two dilutions were used: 1 g/l for the determination of the Na, and the elements Ag, Al, As, Ba, Si, Cd, Co, Cr, Cu, Ni, Pb, Sb, Se, Sn, Sr, Ti and Zn in trace amount, and 0.1 g/l for the analysis of the lithium.

Panoramic Qualitative Analysis:

The ICP-AES (inductively-coupled plasma spectrometry) conditions applied for the "panoramic" semiquantitative analysis of the elements in trace amount are:

Output power of the plasma source: 1150 W
Flow rate of the nebulization gas: 0.7 L/min
Cooling rate=16 L/min
Torch height: 12 mm
Pump speed: 50 rpm
Spectral bandwidth: 7 pm to 200 nm, 3.5 nm per pixel
Wavelength range: 167 nm to 847 nm.

The ICP-AES quantification method for measuring Li, Na used five calibration points. The ICP-AES data are obtained on an ICAP 6500 spectrometer (Thermo Electronics).

For the analysis of the elements in trace amount Ag, Al, As, Ba, Si, Cd, Co, Cr, Cu, Ni, Pb, Sb, Se, Sn, Sr, Ti, Zn, the semiquantitative method is based on two calibration points.

For the two methods, sampling is performed by addition of standards to the sample itself so as to minimize the matrix effects.

ICP-AES is preferred to cationic chromatography in aqueous solution for the measurement of the elements Li and Na.

The conditions for analysis of the anions in ion chromatography (IC) are as follows:

Thermo ICS 5000 DUAL machine;
AS16-HC column;
Flow rate 1 ml/min;
Eluent isocratic KOH at 20 mmol/l;
Conductimetric detection;
ASRS 4 mm suppressor with 50 mA of imposed current;
Injection of 25 µl of LiFSI solutions at 5 g/l and 10 g/l depending on the sensitivity required for the anionic species present;
Calibration of each anionic species with five synthetic solutions ranging from 0.1 mg/l up to 25 mg/l.

The NMR analysis conditions for the fluorinated species such as $FSO_3Li$ and $FSO_2NH_2$ in $^1H$ and $^{19}F$ NMR are as follows:

Equipment: The NMR spectra and quantifications were performed on a Brüker AV 400 spectrometer, at t 376.47 MHz for $^{19}F$, on a 5 mm probe of BBFO⁺ type.

Sampling: The samples are dissolved in DMSO-d6 (about 30 mg in 0.6 ml). In the case of detection of fluorides or of addition of LiF serving to check the undesirable presence of fluorides, the solvent used is $D_2O$ on account of the insolubility of LiF in DMSO.

Quantification: The relative quantification in fluorine-19 NMR ($^{19}F$ NMR) is performed by integration of the signals for the fluorinated species, weighted by the number of fluorines contributing to the signal, which is a method well known to those skilled in the art.

The absolute quantification in $^{19}F$ NMR is performed by dosed addition of α☐α☐α-trifluorotoluene (TFT, Aldrich) to the tube containing the sample, and by integration of the signals for the fluorinated species to be assayed in comparison with that of the $CF_3$ of this internal standard, according to the method that is well known to those skilled in the art. The quantification limit for a species is of the order of a 50th of a ppm.

Water content: Performed by Karl Fischer assay on a 684 KF coulometer coupled to an 860 KF Thermoprep (Metrohm equipment).

The solid sample of LiFSI is transferred in a glovebox into a suitable Thermoprep bottle. It is heated at 50° C. for 30 minutes and the gas phase is then introduced into the assay cell of the KF titrimeter.

The results obtained are presented in table I.

TABLE I

| Species | Amount | Analysis method |
|---|---|---|
| $FSO_2NH_2$ | ND | $^{19}F$ NMR |
| $FSO_3Li$ | ND | $^{19}F$ NMR |
| $H_2O$ | 34 ppm | Karl Fischer |
| $SO_4^{2-}$ | 80 ppm | CI |
| $Cl^-$ | 35 ppm | CI |
| F- | <50 ppm | NMR |
| $CO_3^{2-}$ | ND | CI |
| $ClO_3^-$ | ND | CI |
| $ClO_4^-$ | ND | CI |
| $NO_2^-$ | ND | CI |
| $NO_3^-$ | ND | CI |
| Mg | ND | ICP |
| Si | ND | FX |
| Fe | ND | ICP |
| Ca | ND | ICP |
| Pb | ND | ICP |
| Cu | ND | ICP |
| Cr | ND | ICP |
| Ni | ND | ICP |
| Al | ND | ICP |
| Zn | ND | ICP |
| Na | ND | ICP |

ND: not detected

The purification and drying process according to the invention advantageously makes it possible to obtain an LiFSI salt with a low content of residual water, namely less than or equal to 40 ppm, and a low content of impurities. For example, the sulfate content is less than 100 ppm, and is especially 80 ppm.

The invention claimed is:

1. A composition C comprising:
   at least 99.80% by weight of lithium bis(fluorosulfonyl) imide (LiFSI) salt relative to the total weight of said composition C;
   between 5 ppm and 45 ppm by mass of water relative to the total mass of said composition C, and
   a mass content of $LiFSO_3$ of less than or equal to 200 ppm.

2. The composition C as claimed in claim 1, comprising a mass content of sulfate ions of less than or equal to 200 ppm by mass relative to the total mass of said composition C.

3. The composition C as claimed in claim 1, comprising:
   a mass content of sulfate ions of less than or equal to 200 ppm by mass relative to the total mass of said composition C; and
   a mass content of $Cl^-$ of less than or equal to 50 ppm by weight;
   a mass content of $F^-$ of less than or equal to 200 ppm;
   a mass content of $FSO_2NH_2$ of less than or equal to 200 ppm;
   a mass content of $CO_3^{2-}$ of less than or equal to 50 ppm;
   a mass content of $ClO_3^-$ of less than or equal to 50 ppm;
   a mass content of $ClO_4^-$ of less than or equal to 50 ppm;
   a mass content of $NO_2^-$ of less than or equal to 50 ppm;
   a mass content of $NO_3^-$ of less than or equal to 50 ppm;
   a mass content of Si of less than or equal to 40 ppm;
   a mass content of Mg of less than or equal to 10 ppm;
   a mass content of Fe of less than or equal to 10 ppm;
   a mass content of Ca of less than or equal to 10 ppm;
   a mass content of Pb of less than or equal to 10 ppm;
   a mass content of Cu of less than or equal to 10 ppm;
   a mass content of Cr of less than or equal to 10 ppm;
   a mass content of Ni of less than or equal to 10 ppm;
   a mass content of Al of less than or equal to 10 ppm;
   a mass content of Zn of less than or equal to 10 ppm; and
   a mass content of Na of less than or equal to 10 ppm.

4. A Li-ion battery comprising a composition C as claimed in claim 1.

5. The Li-ion battery as claimed in claim 4, wherein the Li-ion battery is in a mobile device, an electric vehicle, or a renewable energy generation system.

* * * * *